(12) United States Patent
Humblet et al.

(10) Patent No.: US 6,466,577 B1
(45) Date of Patent: Oct. 15, 2002

(54) METHOD AND APPARATUS FOR POINT-TO-POINT AND POINT-TO-MULTIPOINT CONNECTIONS IN AN ATM NETWORK

(75) Inventors: Pierre A. Humblet, Cambridge; Bruce D. Miller, North Reading; Raj Shanmugaraj, Groton; Steven Sherry, Needham, all of MA (US)

(73) Assignee: Alcatel Communications, Inc., Chelmsford, MA (US)

( * ) Notice: Subject to any disclaimer, the term of this patent is extended or adjusted under 35 U.S.C. 154(b) by 0 days.

(21) Appl. No.: 09/290,051

(22) Filed: Apr. 12, 1999

(51) Int. Cl.[7] .......................... H04L 12/28; H04L 12/56
(52) U.S. Cl. .................... 370/395.3; 370/397; 370/409
(58) Field of Search ........................ 370/230, 395.1, 370/396, 397, 398, 399, 395.2, 395.21, 395.3, 395.32, 409, 465, 474

(56) References Cited

U.S. PATENT DOCUMENTS

| | | | |
|---|---|---|---|
| 5,345,558 A | 9/1994 | Opher et al. ................. 395/200 |
| 5,600,795 A | 2/1997 | Du ......................... 395/200.02 |
| 5,627,836 A | 5/1997 | Conoscenti et al. ........ 370/397 |
| 5,844,887 A | 12/1998 | Oren et al. ................. 370/218 |
| 5,862,136 A | 1/1999 | Irwin ........................ 370/395 |
| 5,867,502 A | 2/1999 | Chang ........................ 370/477 |
| 5,917,819 A | * 6/1999 | Yang et al. ................. 370/390 |
| 6,034,958 A | * 3/2000 | Wicklund .................... 370/395 |
| 6,144,666 A | * 11/2000 | Chen et al. .................. 370/395 |
| 6,275,494 B1 | * 8/2001 | Endo et al. .................. 370/395 |

FOREIGN PATENT DOCUMENTS

| | | |
|---|---|---|
| EP | 0 873 035 A2 | 4/1998 |
| WO | WO99/22567 | 5/1999 |

OTHER PUBLICATIONS

Balboni, G.P., et al., "An ATM Switching Testbed", European Transactions on Telecommunications and Related Technologies, IT, AEI, vol. 2, No. 4, Jul. 1, 1991, pp. 391–401.

* cited by examiner

Primary Examiner—Ricky Ngo
(74) Attorney, Agent, or Firm—Hamilton, Brook, Smith & Reynolds, P.C.; V. Lawrence Sewell; Jessica W. Smith

(57) ABSTRACT

A mechanism for providing point-to-point and point-to-multipoint connections in an ATM network converts VPI/VCI information at an ingress ATM device on incoming cells from a source endpoint to internal VP/VCI information that is used to switch the cells through an ATM network to an egress ATM device. At the egress ATM device, the internal VPI/VCI information is converted back to the source VPI/VCI information for transmission of cells to the destination endpoint. In such a manner, an ATM switch network is able to provide point-to-point connections without requiring individual configuration of VPI/VCI information at the ingress and egress ATM devices.

28 Claims, 15 Drawing Sheets

METHOD AND APPARATUS FOR POINT-TO-POINT AND POINT-TO-MULTIPOINT CONNECTIONS IN AN ATM NETWORK

BACKGROUND OF THE INVENTION

The traditional telecommunications network operated by the telephone companies uses circuit switching and time division multiplexed (TDM) transmission. A TDM channel is characterized by the use of fixed time periods known as frames. Each frame in turn is divided into a fixed number of timeslots. With TDM, a fixed amount of bandwidth is dedicated through the network for the duration of a circuit switched connection. This bandwidth is fixed such that even if there is no data or voice being transmitted for a period of time, resources of the network are used to support the connection.

High speed transmission over fiber-optic networks uses a synchronous hierarchy of TDM transmission rates known as Synchronous Optical Network (SONET). This Bellcore-defined standard established a set of data rate and framing standards for data transmission using optical signals over fiber-optic cables. The SONET data rate and framing standards are designated as Synchronous Transport Signal (STS-n) levels; the corresponding SONET optical signal standards are designated as Optical Carrier (OC-n) levels. For the STS level, "n" represents the level at which the respective data rate is exactly "n" times the first level. For example, STS-1 has a defined data rate of 51.84 Mbps; thus, STS-3 is three times the data rate of STS-1, or 3×51.84=155.52 Mbps. Corresponding to each data rate is an equivalent optical fiber rate. For example, the OC-1 fiber rate corresponds to STS-1, and OC-3 corresponds to STS-3.

In a typical SONET application, as shown in the block diagram of FIG. 1, add/drop multiplexers (ADMs) 12 are connected in a logical ring 14. For a point-to-point connection between source and destination endpoints 10a and 10b, respectively, each endpoint 10a, 10b is allocated a fixed number of timeslots at both the ingress and egress ADMs 12a, 12b. For example, the endpoints 10a, 10b are shown with an allocation of an OC-3c rate which is defined as 155.52 Mbps in the SONET hierarchy.

To setup or provision such a connection, the network operator configures the SONET transmission facilities using information about the source and destination endpoints, e.g., node, slot, port (and optionally timeslots) at the ingress and egress ADMs 12a, 12b. A primary advantage of this TDM scheme is that connections are very easy to configure and manage. All the operator needs to know is the port to port connectivity required. The operator does not need to know about the particular traffic being carried within the connection in order to setup the connection through the network.

There are, however, several drawbacks with the TDM approach. One drawback is that it does not provide for any statistical multiplexing gains when there is no actual traffic on a particular established connection. This means that each connection needs to have dedicated bandwidth which, once configured, does not allow for sharing of network resources.

Another drawback is that the ingress and egress ports have to match each other in allocated bandwidth. For example, an OC-3c port on ingress can only be connected to an OC-3c port or an OC-3 within an OC-12 on egress. That is, a connection cannot be made between an OC-3c on ingress and, for example, an OC-12c on egress.

A further drawback of the TDM approach is that bandwidth can only be provisioned in increments defined by the TDM hierarchy, e.g., the aforementioned SONET rates or the traditional hierarchy of DS-n rates. The TDM approach does not provide for flexible data rates between these discrete TDM increments.

A cell relay approach, such as defined for asynchronous transfer mode (ATM) networks, avoids the aforementioned drawbacks. ATM networks use fixed-length cells to provide connection-oriented data transmission in which multiple traffic types (e.g., voice, data and video) are asynchronously combined on a communication channel such that the transmission bandwidth on the channel can be allocated as needed to the multiple traffic types. That is, bandwidth is flexible. ATM is a simple, fast, cell-switching technology which derives its cell routing capabilities from information carried within a header in each cell.

In ATM, there are two types of interfaces defined: the user-network interface (UNI) for use between an endpoint and an ATM switch and the network-node interface (NNI) for use between two ATM switches. The standard ATM cell format for the UNI is shown in FIG. 2. An ATM cell contains 53 octets and has two parts: a 5-octet header and a 48-octet payload. The header includes the following fields: generic flow control (GFC); virtual path identifier (VPI); virtual channel identifier (VCI); payload type (PT); cell loss priority (CLP); and header error check (HEC). The VPI and VCI fields together represent an ATM address that is used for mapping incoming VPI/VCI to outgoing VPI/VCI based on the connection type (permanent virtual circuit or switched virtual circuit). The standard ATM cell format for the NNI has no GFC field in the header and a larger VPI field.

There are two types of connections in an ATM network: virtual paths, identified by a VPI in the cell header, and virtual channels, identified by the combination of a VPI and a VCI. A virtual path is a collection of virtual channels which are switched together across the ATM network according to the same VPI. A transmission link is a collection of virtual paths and virtual channels. FIG. 3 shows this relationship among virtual channels, virtual paths and the transmission link.

ATM cells can be carried within the synchronous payload envelope of a SONET frame as shown in FIG. 4. The STS-3c frame includes a SONET framing signal 20 and a payload section that accommodates 44 ATM cells generally labeled 22. Because the cell rate is not an integer number of the frame rate, the last cell 22-x1 is continued in the next frame as cell 22-x2. The cell boundaries change from frame to frame and only repeat with each fifty-third frame. The flexible bandwidth nature of ATM is evident by noting that succeeding cells 22-a, 22-b have differing VPI/VCI information.

The basic ATM switching operation is described briefly. A cell is received at an incoming port of an ATM device. The received cell includes incoming VPI and VCI values in its header. The ATM device looks up the incoming VPI/VCI values in a local translation table which correlates the incoming port and VPI/VCI values with an outgoing port and outgoing VPI/VCI values. The incoming VPI/VCI values are replaced with the outgoing VPI/VCI values in the cell header and the cell is then transmitted to the next ATM device in the network connection through the corresponding outgoing port. This cell processing is repeated at each succeeding ATM device along the connection until the cell reaches its destination. Since the VPI/VCI have only local significance across a particular link in the end-to-end connection, it is clear then that each cell enters and exits the end-to-end connection with different VPI/VCI values.

One drawback with traditional methods of provisioning point-to-point ATM connections is that at each ATM device along the connection, the network operator has to configure the incoming and outgoing VPI/VCI information in the translation table. Alternatively, the ATM cells can be transported together transparently in a TDM "pipe" such as a SONET OC-3c circuit. However, this TDM approach to transport of ATM is bandwidth inefficient when the circuit is not fully loaded.

SUMMARY OF THE INVENTION

A need exists for an approach to ATM provisioning of point-to-point connections that emulates the configuration ease and transparency of a TDM pipe but is bandwidth efficient. A need also exists for a provisioning approach that does not require the operator to configure each incoming and outgoing VPI/VCI for the ATM devices in a network connection.

In accordance with the present invention, a novel mechanism for providing point-to-point connections converts VPI/VCI information at an ingress ATM device on incoming cells from a source endpoint to internal VP/VCI information that is used to switch the cells through an ATM network to an egress ATM device. At the egress ATM device, the internal VPI/VCI information is converted back to the source VPI/VCI information for transmission of cells to the destination endpoint. In such a manner, an ATM switch network is able to provide point-to-point connections without requiring individual configuration of VPI/VCI information at the ingress and egress ATM devices.

According to the present invention, a method for providing a connection between a source endpoint and destination endpoint through an ATM network comprises providing a network of plural ATM switching nodes, including an ingress node and an egress node, the ingress node having a receiving port for receiving ATM cells from a source endpoint, and the egress node having a transmitting port for transmitting ATM cells to a destination endpoint. At the ingress node, source ATM cells are received, with each ATM cell having a header that includes source virtual path identifier/virtual circuit identifier (VPI/VCI) information. The source VPI/VCI information of each received source ATM cell is mapped to internal VPI/VCI information to provide internal ATM cells that are switched through the network on a virtual path to the egress node. The virtual path corresponds to the internal VPI/VCI information. At the egress node, the internal VPI/VCI information of each internal ATM cell is mapped to the source VPI/VCI information for transmission to the destination endpoint.

According to an aspect of the invention, mapping of the source VPI/VCI information at the ingress node includes mapping a source VPI and a source VCI to an internal VCI by selecting N bits of the source VCI; storing the N selected bits in a register; selecting M bits of the source VPI; storing the M selected bits in the register to the left of the N bits to provide M+N bits; and replacing the VCI field of the source ATM cell with the M+N bits from the register.

According to another aspect of the invention, mapping of the internal VPI/VCI information at the egress node includes mapping the internal VCI to the source VPI and the source VCI by selecting M bits from bit positions N+1 to N+M of the internal VCI; replacing the VPI field of the internal ATM cell with the M selected bits; selecting N bits from bit positions 1 to N of the internal VCI; and replacing the VCI field of the internal ATM cell with the N selected bits.

According to a further aspect of the invention, a mechanism for providing point-to-multipoint and multipoint-to-multipoint connections maps the source VPI/VCI information of each received source ATM cell at an ingress node to internal VPI/VCI information having information indicating a particular egress node. Internal ATM cells are switched through the network to the particular egress node indicated by the internal VPI/VCI information. At each particular egress node, the internal VPI/VCI information of each internal ATM cell is mapped to the source VPI/VCI information for transmission to the corresponding destination endpoint. The mapping of the source VPI/VCI information includes mapping a source VPI and a source VCI to an internal VCI and mapping a portion of the source VPI to an internal VPI indicating a particular egress node.

According to an alternate embodiment of the invention, mapping of the source VPI/VCI information at the ingress node includes mapping a source VPI and a source VCI to an internal VPI and internal VCI, respectively. A mapping information message is transmitted from the ingress node to the egress node indicating the mapping at the ingress node. The mapping information message is received at the egress node and the internal VPI and VCI are mapped to the source VPI and VCI, respectively, according to the mapping indicated by the mapping information message.

The term "point-to-point" is used herein to refer to a connection from one source endpoint to a single destination endpoint. Within that point-to-point connection there can be ATM cells having different VPI and VCI values.

The term "point-to-multipoint" is used herein to refer to a connection from one source endpoint to multiple destination endpoints. In a point-to-multipoint connection as used herein, ATM cells from a source endpoint are routed to a destination endpoint based on the VPI value contained within the cell.

The term "multipoint-to-multipoint" is used herein to refer to a mesh network having multiple source endpoints connected to multiple destination endpoints.

It should be noted that, while the preferred embodiments are described in the context of ATM cell relay, the principles of the invention are also applicable to multi-protocol label switching.

Figure 1:
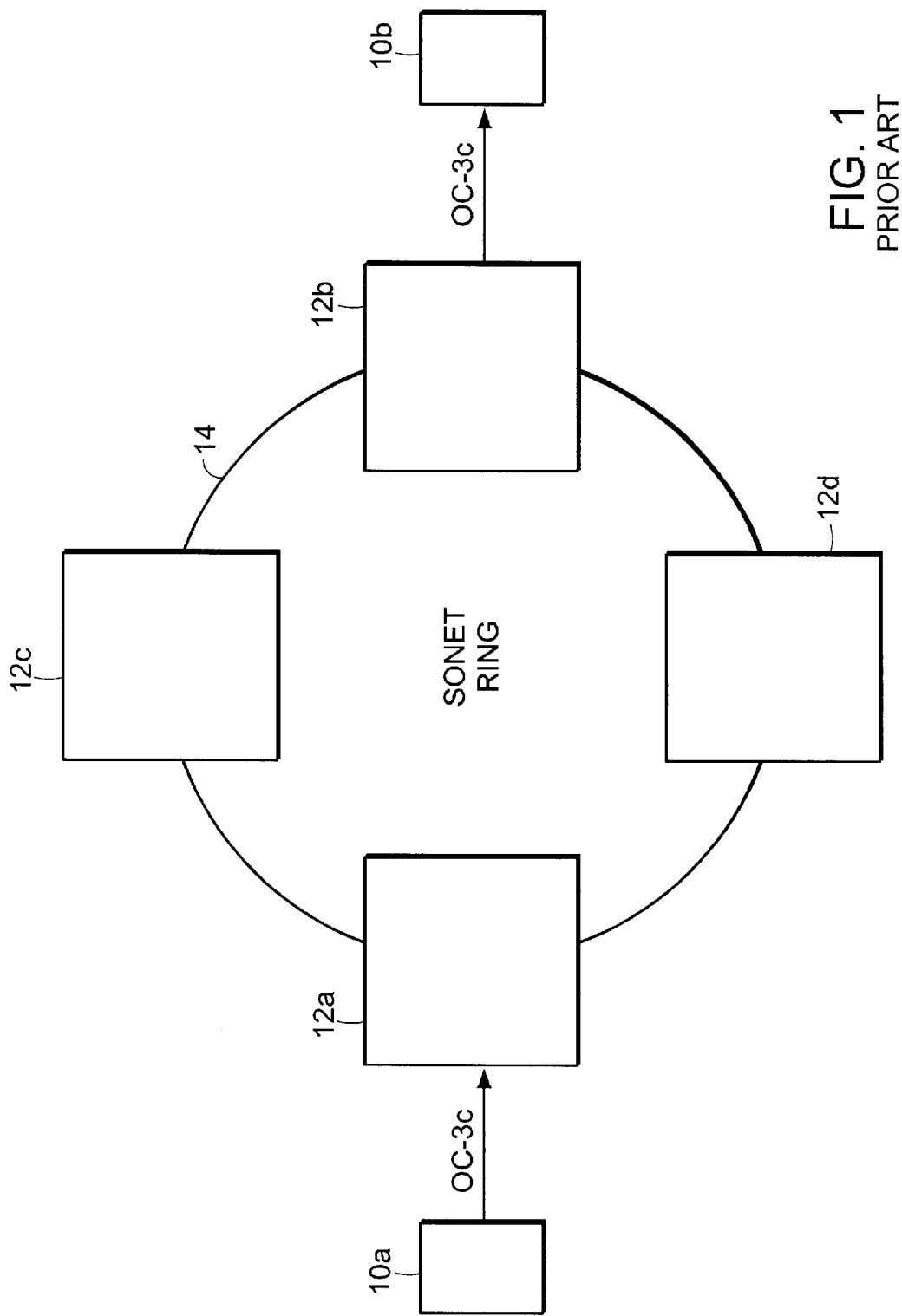
FIG. 1 is a block diagram of a prior art SONET ring arrangement.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 5:
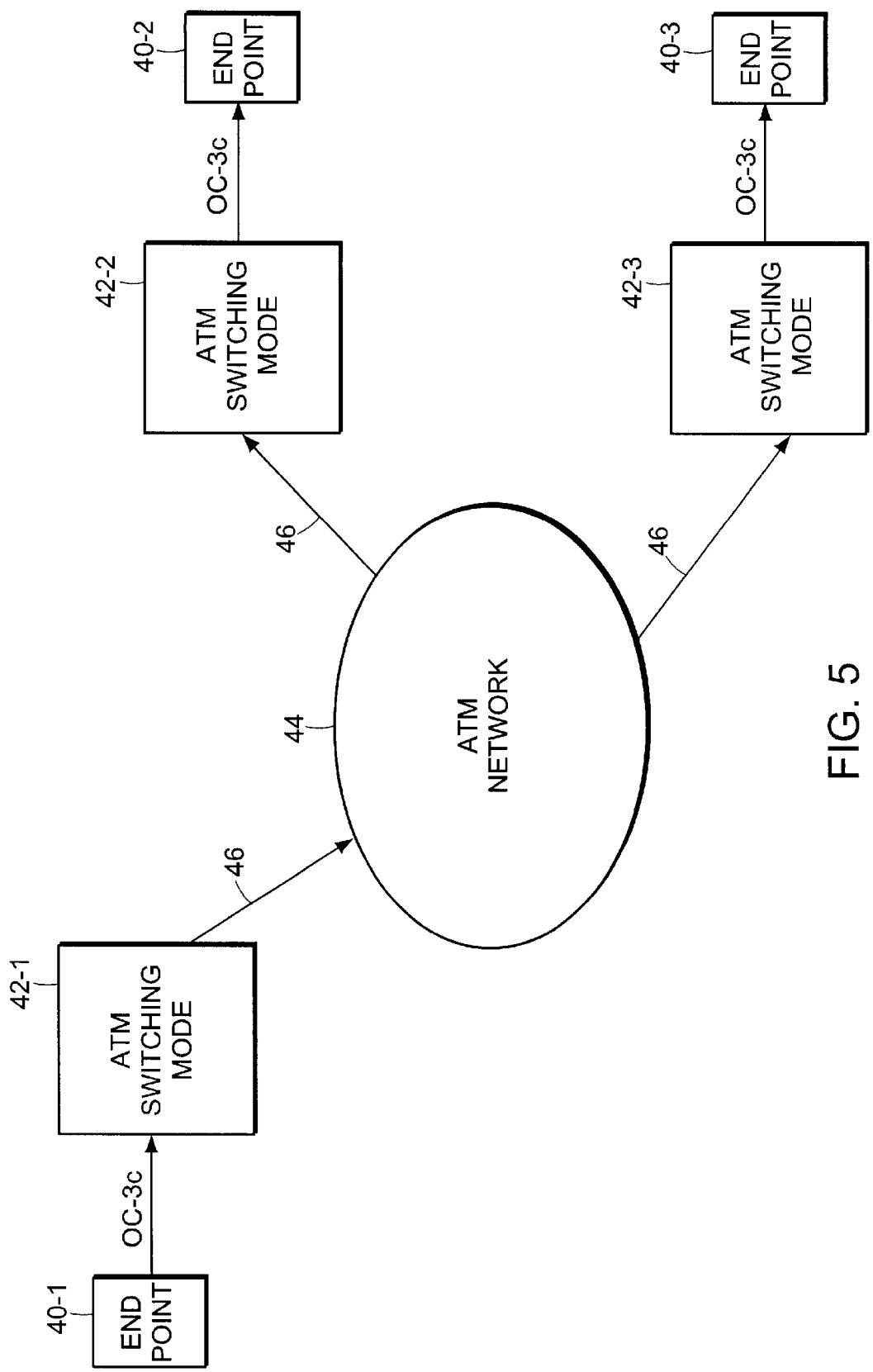
FIG. 5 is a block diagram showing an ATM network arrangement in accordance with the present invention.

Referring to FIG. 5, an exemplary ATM network arrangement is shown which can be used to illustrate general principles of the present invention. The network arrangement includes ATM switching nodes labeled 42-1, 42-2, 42-3 connected through links 46 to an ATM network 44 that can include further ATM switching nodes. ATM switching node 42-1 is shown connected to an endpoint 40-1 which provides source ATM cells that are transported to the node 42-1 within a SONET OC-3c transmission link. For simplicity, transmission is shown in one direction, though it should be understood that transmission is typically bidirectional between endpoints. Also for simplicity, the node 42-1 is referred to as an ingress node and nodes 42-2, 42-3 are referred to as egress nodes. It should also be understood that in a bidirectional arrangement an ingress node also functions as an egress node and an egress node also functions as an ingress node. As described further herein, possible destinations for the source ATM cells include endpoints 40-2 and 40-3 which are shown connected to respective ATM switching nodes 42-2 and 42-3 via SONET OC-3c transmission links.

Assume for example that all of the source ATM cells from endpoint 40-1 are destined for endpoint 40-2. The source ATM cells can include cell headers for which the VPI and VCI differ from cell to cell in the stream of ATM cells that are carried within the payload envelope of the SONET OC-3c link. A point-to-point connection between nodes 42-1 and 42-2 in accordance with the present invention is now described with reference to FIG. 6.

Figure 6:
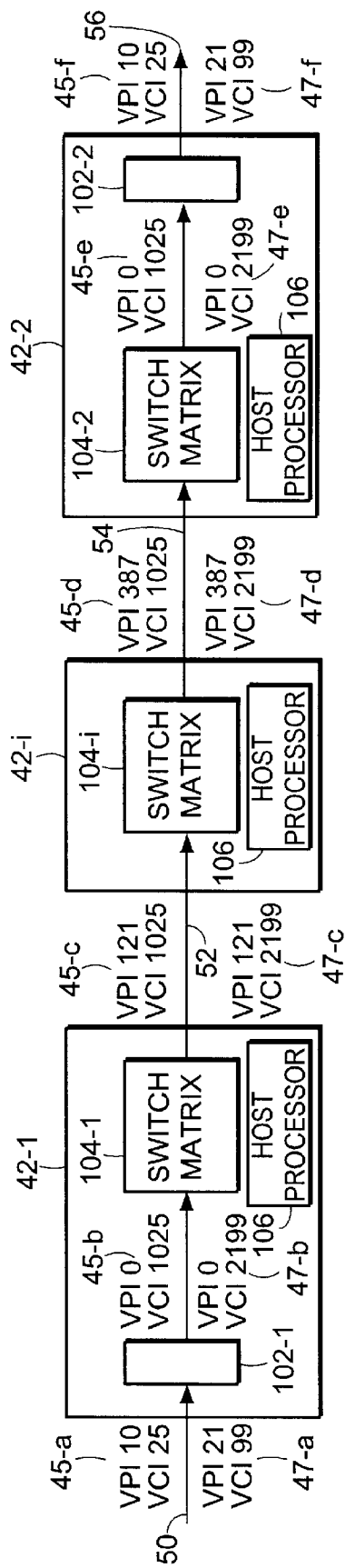
FIG. 6 is a block diagram showing a point-to-point connection between an ingress node and an egress node in accordance with the present invention.

The point-to-point connection of FIG. 6 shows ingress node 42-1 connected to egress node 42-2 through an intermediate ATM switching node 42-i. A source cell stream on link 50 connects to a receiving port of the ingress node 42-1 and exits a transmitting port of the egress node 42-2 on a destination cell stream 56. Each of the nodes are shown having a switch matrix 104-1, 104-2 and a host processor 106. The operation and functions of an ATM switch matrix are generally known in the art. The ingress and egress nodes 42-1 and 42-2 each further include a cell processor 102-1, 102-2 which provides a novel cell mapping/remapping function that is described further herein.

The cell processor 102-1 at the ingress node 42-1 essentially maps the source VPI/VCI information for each cell on ingress to an internal VPI/VCI. The internal VPI/VCI information is used to indicate a virtual path that is switched through the intermediate node 42-i such that scheduling decisions do not depend on the internal VCI and the order of the cells on the virtual path are preserved. At the egress node, the cell processor 102-2 remaps the internal VPI/VCI back to the original VPI/VCI information.

Figure 7:
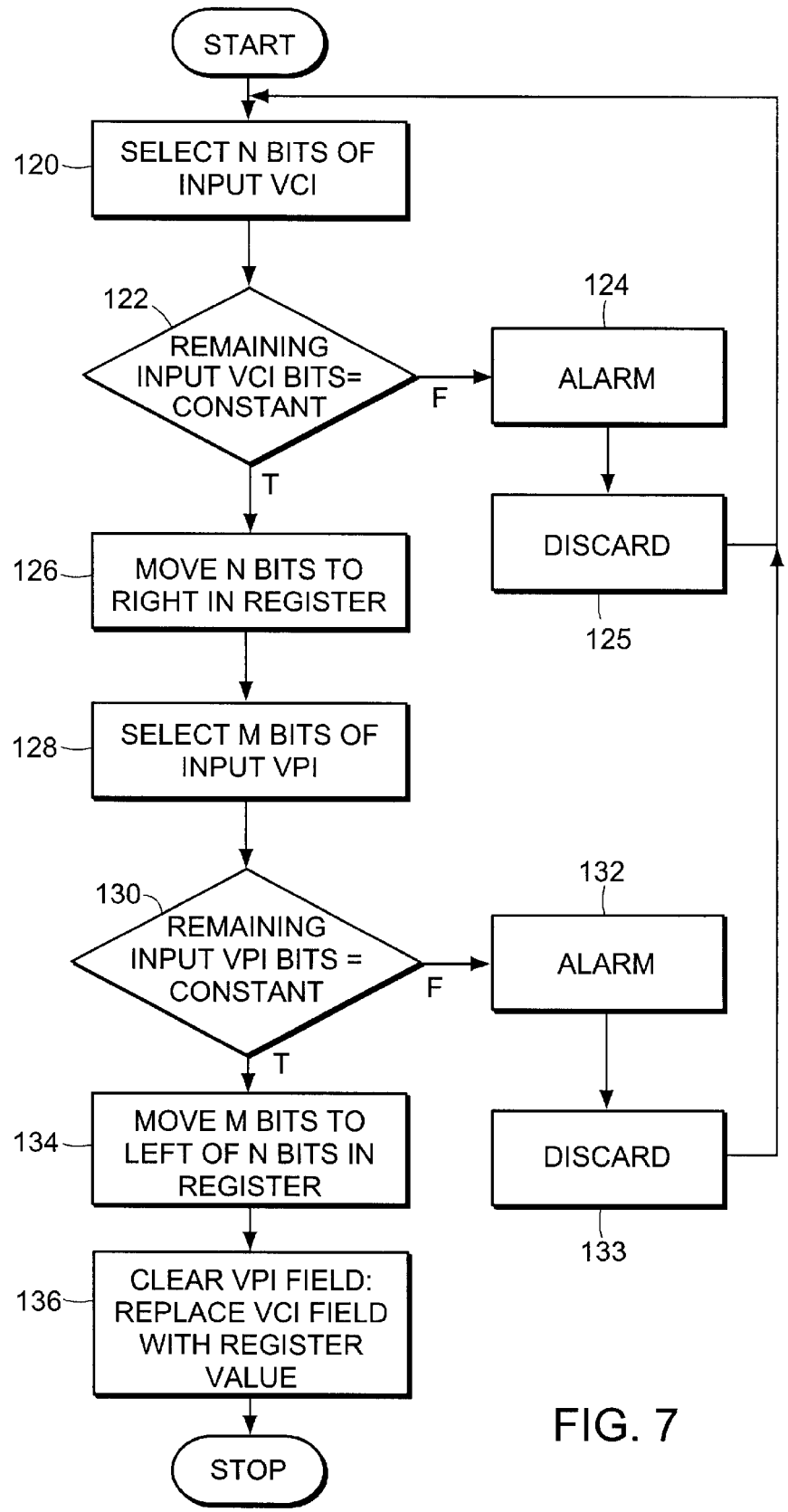
FIG. 7 is a flow diagram showing a mapping process for use in the ingress node of the arrangement of FIG. 6.

The mapping process which the cell processor 102-1 performs on ingress at node 42-1 is shown in the process flow diagram of FIG. 7. In a preferred embodiment, the process is performed in hardware which is described further herein. It should be understood that the process can also be performed in software.

Figure 2:
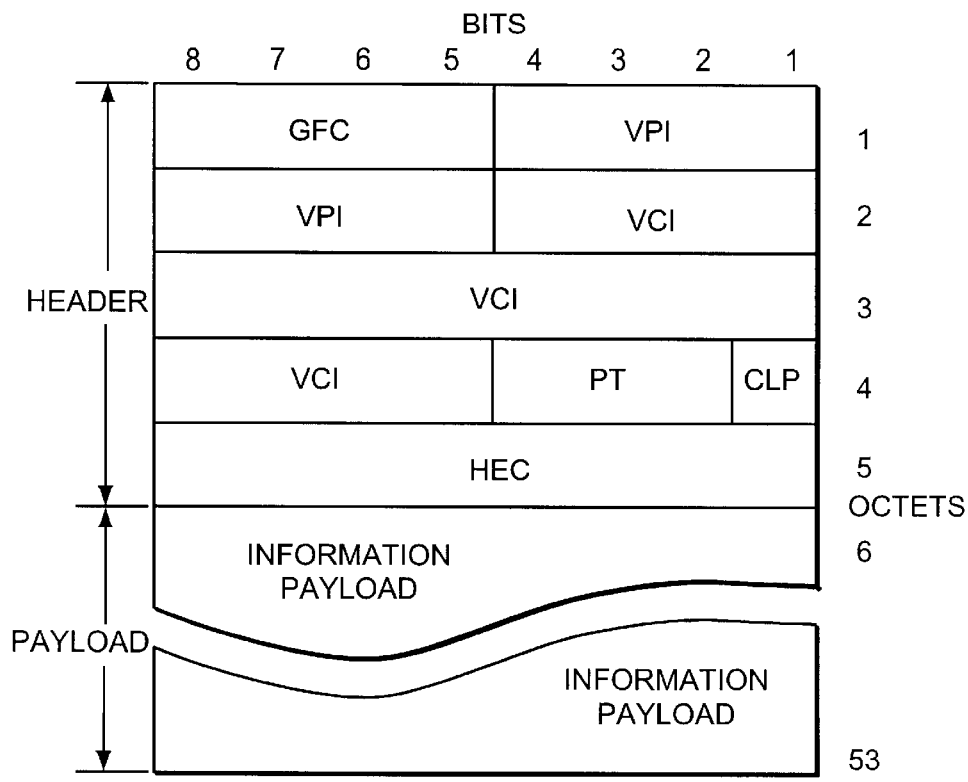
FIG. 2 is a diagram showing the structure of an ATM cell.
Figure 3:
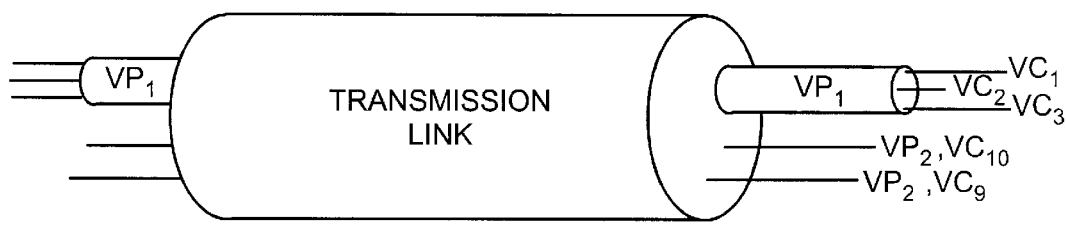
FIG. 3 is a diagram showing the relationship among virtual circuits, virtual paths and a transmission link.
Figure 4:
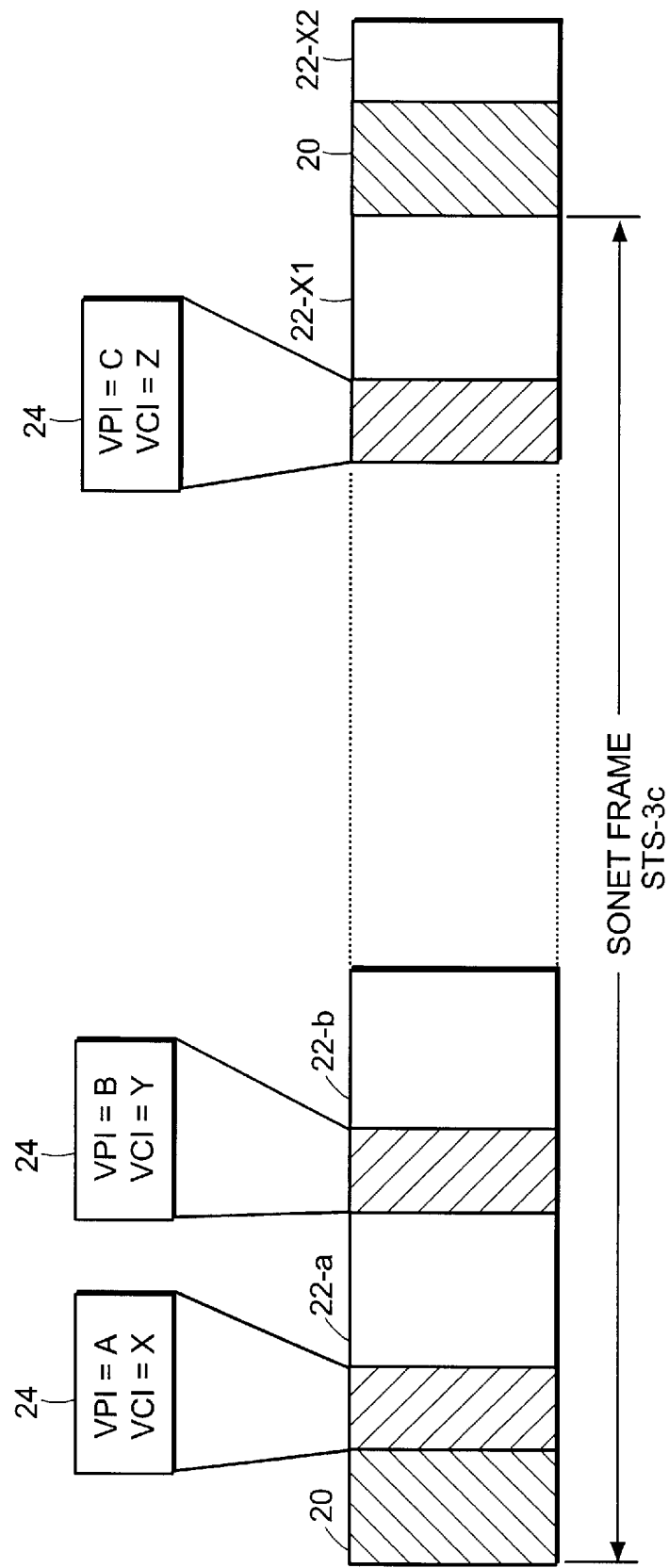
FIG. 4 is a diagram showing ATM cells carried in a SONET STS-3c frame.

As shown above in FIG. 2, the VPI field in an ATM cell header contains either 8 or 12 bits depending on whether the ATM cell is a UNI or NNI type cell. The VCI field contains 16 bits. Referring again to FIG. 7, the cell mapping process starts at block 120 with the selection of N bits of the input VCI, where $N \leq 16$. Generally, the N bits selected are the least significant bits. At block 122, the remaining unselected VCI bits are checked to determine whether such bits are equal to a constant (typically zero) provided by system configuration management software. If these remaining bits are not equal to the constant, then an alarm event is generated at block 124, the result is discarded at block 125 and the process returns to the start. If the remaining bits are equal to the constant, processing continues at block 126 wherein the N selected bits are moved to the rightmost positions of an internal register. At block 128, M bits of the input VPI are selected, where $M \leq 12$. Since the M+N bits are used to replace the VCI field, as described below, an additional constraint is that $M+N \leq 16$, the size of the VCI field. It is thus of interest to decrease the size of M, the number of VPI bits copied to the VCI field so that more VCIs can be accommodated.

At block 130, the remaining unselected VPI bits are checked to determine whether such bits are equal to a constant (typically 0) provided by system configuration management software. If these remaining bits are not equal to the constant, then an alarm event is generated at block 132, the result is discarded at block 133 and the process returns to start. If the remaining bits are equal to the constant, processing continues at block 134 wherein the M selected bits are moved to the left of the N bits in the internal register. Alternatively, the M selected bits can be placed in the M most significant bit positions in the internal register. At block 136, the VPI field of the cell is cleared or set to a fixed value (e.g., 1) known to the switch fabric and the VCI field is replaced with the contents of the internal register. In the manner described, the source VPI/VCI is mapped to an internal VCI.

Figure 8:
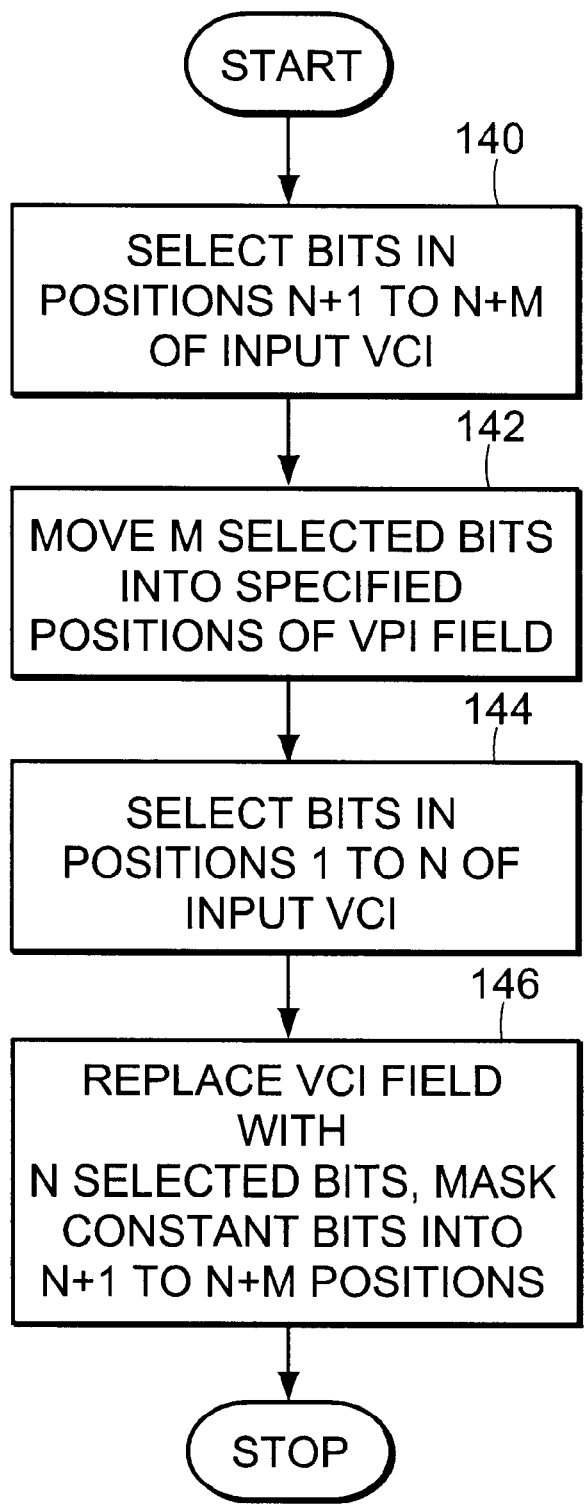
FIG. 8 is a flow diagram showing a mapping process for use in the egress node of the arrangement of FIG. 6.

The mapping process which the cell processor 102-2 performs on egress at node 42-2 is shown in the process flow diagram of FIG. 8. The cell mapping process starts at block 140 with the selection of M bits from bit positions N+1 to N+M (starting from the least significant bit position) of the input VCI. Alternatively, the M most significant bits are selected. At block 142, the M selected bits are moved into specified positions of the VPI field, i.e., those bit positions of the M bits selected from the original input VPI. At block 144, N bits of the input VCI are selected from bit positions 1 to N. The VCI field is replaced with the N selected bits at block 146. In addition, the bits which correspond to the unselected VCI bits at the ingress (see block 122, FIG. 7) need to be restored to the VCI field. These VCI bits correspond to the constant provided by the system configuration management software and are masked into the N+1 to N+M bit positions. In this manner, the internal VCI is remapped to the original VPI/VCI.

Referring again to FIG. 6, the mapping processes shown in FIGS. 7 and 8 can be illustrated by an example. Note that the ATM VPI and VCI are in hexadecimal notation. An ATM cell 45-a having source VPI=(0x10) and VCI=(0x25) is received on link 50 at an input port on node 42-1. The cell is processed by cell processor 102-1 according to the process shown in FIG. 7 to replace the source VPI/VCI with an internal VPI=(0x00) and internal VCI=(0x1025). The cell 45-b with this internal VPI/VCI information is then passed to switch fabric 104-1 where the internal VPI/VCI information is translated via a local translation table to an outgoing VPI=(0x121) and outgoing VCI=(0x1025) on internal link 52. The intermediate node 42-i receives the cell 45-c on a virtual path indicated by VPI=(0x121) and routes the cell to an outgoing virtual path indicated by VPI=(0x387) on internal link 54. Note that since the internal switching is virtual path switching, the VCI remains the same, i.e., VCI=(0x1025). At the egress node 42-2, the cell 45-d with VPI=(0x387) and VCI=(0x1025) is received and translated via a local translation table associated with switch fabric 104-2 to an internal cell 45-e with VPI=(0x00) and internal VCI=(0x1025). The cell 45-e with this internal VPI/VCI information is passed to cell processor 102-2 which remaps the internal VPI/VCI information to provide a cell 45-f with the original source VPI=(0x10) and VCI=(0x25) according to the process shown in FIG. 8. Refrrring to the ATM cell 47-f with having source VPI=(0x21 ) and VCI=(0x99) received on link 50 at ingress node 42-1, one can readily determine that the same processing as described above, i.e., mapping according to FIG. 7 and remapping according to FIG. 8, yields a cell 47-f with the original source VPI=(0x 21) and VCI=(0x99) at the egress node 42-2. It should be noted that since virtual path switching is used internally, the source cells having differing VPI values but destined for the same destination endpoint share the same internal virtual path as defined by the internal VPIs (e.g., VPI=(0x121), VPI=(0x387)).

Having described the mechanism for providing point-to-point connections, a description of a mechanism for point-to-multipoint follows.

Referring again to FIG. 5, assume now that a portion of the source ATM cells from endpoint 40-1 are destined for endpoint 40-2 and another portion of the source cells from endpoint 40-1 are destined for endpoint 40-3. For example, one range of VPI values in the cell headers from endpoint 40-1 are intended for endpoint 40-2 while another range of VPIs are intended for endpoint 40-3. A point-to-multipoint connection between nodes 42-1 and nodes 42-2, 42-3 in accordance with the present invention is now described with reference to FIG. 9.

Figure 9:
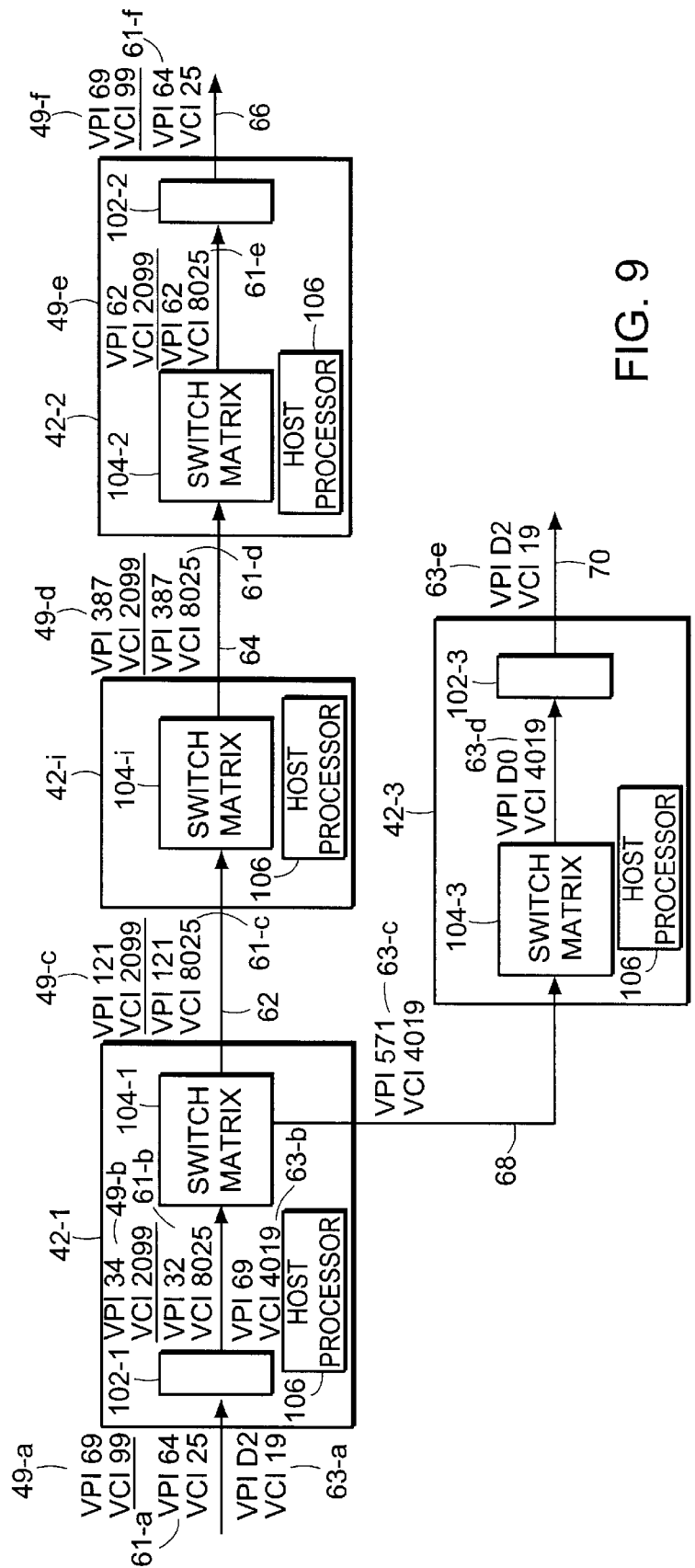
FIG. 9 is a block diagram showing a point-to-multipoint connection between an ingress node and two egress nodes in accordance with the present invention.

The point-to-multipoint connection of FIG. 9 shows ingress node 42-1 connected to egress node 42-2 through an intermediate ATM switching node 42-i. In addition, ingress node 42-1 is connected directly to egress node 42-3. A source cell stream that includes ATM cells 49-a, 61-a and 63-a connects to a receiving port of the ingress node 42-1. Cells 49-a and 61-a exit a transmitting port of the egress node 42-2 as cells 49-f and 61-f, respectively, on a destination link 56. Cell 63-a exits a transmitting port of the egress node 42-3 as cell 63-e on destination link 70. The ingress node 42-1 and the egress nodes 42-2, 42-3 respectively include cell processor 102-1 and 102-2, 102-3 which provide a novel cell mapping/remapping function to provide point-to-multipoint connections that is described further herein.

The mapping/remapping approach that was described above for point-to-point needs to be extended in the case of point-to-multipoint to account for the notion that cells arriving at the ingress node 42-1 are destined for different egress nodes depending on the value of the incoming VPI field in the cell header. There are several approaches that can be taken to implement the mapping/remapping for multipoint, depending on the manner in which the endpoint user maps VPI/VCI information to egress nodes. In common with each approach is that, besides forming the VCI from M+N bits of the input VPI field as was done in the case of point-to-point, P bits of the incoming VPI are used to indicate the particular egress node, where the P bits can overlap with the M selected bits. Three particular approaches are now described.

In a first approach, it is assumed that the endpoint user defines particular ranges of source VPIs destined for a particular egress node. The source VPIs in a particular range are mapped to the same internal VPI. Suppose for example that an endpoint user only uses 4 VPI bits (a common situation) and wants VPIs 0–5 to go to node A, VPIs 6–11 to go to node B and VPIs 12–15 to go to node C. Note that in this example the number of VPIs going to a given node is even, as shown in the following table (the VPIs are represented in binary format):

| A | B | C |
|------|------|------|
| 0000 | 0110 | 1100 |
| 0001 | 0111 | 1101 |
| 0010 | 1000 | 1110 |
| 0011 | 1001 | 1111 |
| 0100 | 1010 |      |
| 0101 | 1011 |      |

Since there are up to 6 VPIs going to the same egress node, M=3 bits are needed to differentiate them. These M bits effectively represent VPI modulo $2^M$. Note that the first P=3 bits are needed to represent the egress node. The P bits represent the quotient of the VPI divided by $2^k$. When all destinations have a multiple of $2^k$ VPIs going to them (aligned on K bit boundaries), the k least significant bits need not be included in P. In this example, k=1. If all destinations have the same number of VPIs then M=k and the P bits are disjoint from the M bits.

At the ingress node, the translation between the P bits and the egress node is done by the local translation table associated with the switch fabric. At the egress node, the internal VPI coming from a node is mapped to the smallest source VPI value going to that particular egress node as communicated by system configuration management software. Thus, for example, the internal VPI is mapped to a VPI of 0110 (binary) for node B. The cell processor replaces the M least significant bits of the internal VPI with the M bits copied from the VCI field. If the result is less than the original internal VPI, the cell processor adds 1 with carry to the $M+1^{st}$ bit. Note that the VPI is considered an unsigned integer for this arithmetic operation.

This first approach reduces M and thus allows N to be larger. Therefore, the endpoint user has a larger pool of possible VCIs. In this approach, the cell processor must be capable of selecting and shifting bits and also performing arithmetic comparison and increment operations. The cell processor in this approach uses configuration information which comprises the values of M, P and N and the positions of those bits.

In a second approach, if the mapping between the source VPI and the egress node is arbitrary, all significant VPI bits must be copied to the internal VCI so as to allow reconstruction of the source VPI at the egress node. In addition, the entire source VPI must be transmitted to the switch fabric for translation. The switch fabric in this approach would require a relatively large VPI translation table that is configured at the ingress node to translate VPIs going to the same egress node into the same internal VPI (this information needs to be supplied by the endpoint user). At the egress node, the internal VPI field becomes irrelevant as it is replaced with VPI bits copied by the cell processor from the internal VCI. In this approach, the cell processor need only be capable of selecting and shifting bits and uses a configuration consisting of the values of M and N (since P=M) and the position of those bits.

In a third approach, the size of the switch fabric translation tables are reduced at the expense of adding a relatively small internal table in the cell processor. This small internal table indicates the smallest VPI for each possible egress node. Thus, the number of entries in the table equals the number of egress nodes. In the example given above, the table would consist of the entries {0000, 0110, 1100}.

At the ingress node in this third approach, construction of the internal VCI is the same as described for the first approach. Construction of the internal VPI on ingress is done by finding the index of the first stored value that is larger than the source VPI (defaulting to the number of destinations if there is no such number). That index minus 1 becomes the internal VPI to the switch fabric. In the above example, 2 bits are needed, the minimum possible. At the egress node, either the egress mapping noted for the first approach can be used or the switch fabric can send the index and the cell processor determines the smallest VPI by looking in its small table.

By reducing the value of P in this third approach, the size of the corresponding local translation table for the switch fabric can be reduced. This reduction can be significant when many VPIs go to only a few egress nodes while many egress nodes have few VPIs going to them. In this approach, however, the cell processor is significantly more complex, requiring the capabilities of selecting and shifting bits, performing arithmetic comparison and increment operations, and looking up and finding an index in a table. The configuration information includes the values of M, P and N, the positions of those bits, and the internal table.

The first approach is the preferred approach. A preferred embodiment of the mapping process which the cell processor 102-1 performs on ingress at node 42-1 to effect point-to-multipoint connection is shown in the process flow diagram of FIGS. 10A and 10B.

The cell mapping process starts at block 150 with the selection of N bits of the input VCI. Generally, the N bits selected are the least significant bits. At block 152, the remaining unselected VCI bits are checked to determine whether such bits are equal to a constant (typically 0) provided by system configuration management software. If these remaining bits are not equal to the constant, then an alarm event is generated at block 154, the result is discarded at block 155 and the process returns to start. If the remaining bits are equal to the constant, processing continues at block 156 wherein the N selected bits are moved to the rightmost positions of an internal register. At block 158, M bits of the input VPI are selected, where the M bits represent the value VPI modulo $2^M$.

At block 160, the M selected bits are moved to the left of the N bits in the internal register. Alternatively, the M selected bits can be placed in the M most significant bit positions in the internal register. At block 162, the VCI field is replaced with the contents of the internal register. At block 164, P bits of the input VPI are selected, indicating the egress node. These P bits represent the value VPI divided by $2^k$, where k is such that all egress nodes have a multiple of $2^k$ VPIs. The remaining unselected VPI bits are checked to determine whether such bits are equal to a constant (typically 0) provided by system configuration management software at block 166. If these remaining bits are not equal to the constant, then an alarm event is generated at block 168, the result is discarded at block 169 and the process returns to start. If the remaining bits are equal to the constant, processing continues at block 170 wherein the VPI field is replaced with the P bits placed in the least significant bit positions. In the manner described, the source VPI/VCI is mapped to an internal VPI/VCI. The switch fabric subsequently translates the internal VPI to an outgoing VPI corresponding to a virtual path going to the egress node.

Figure 10A:
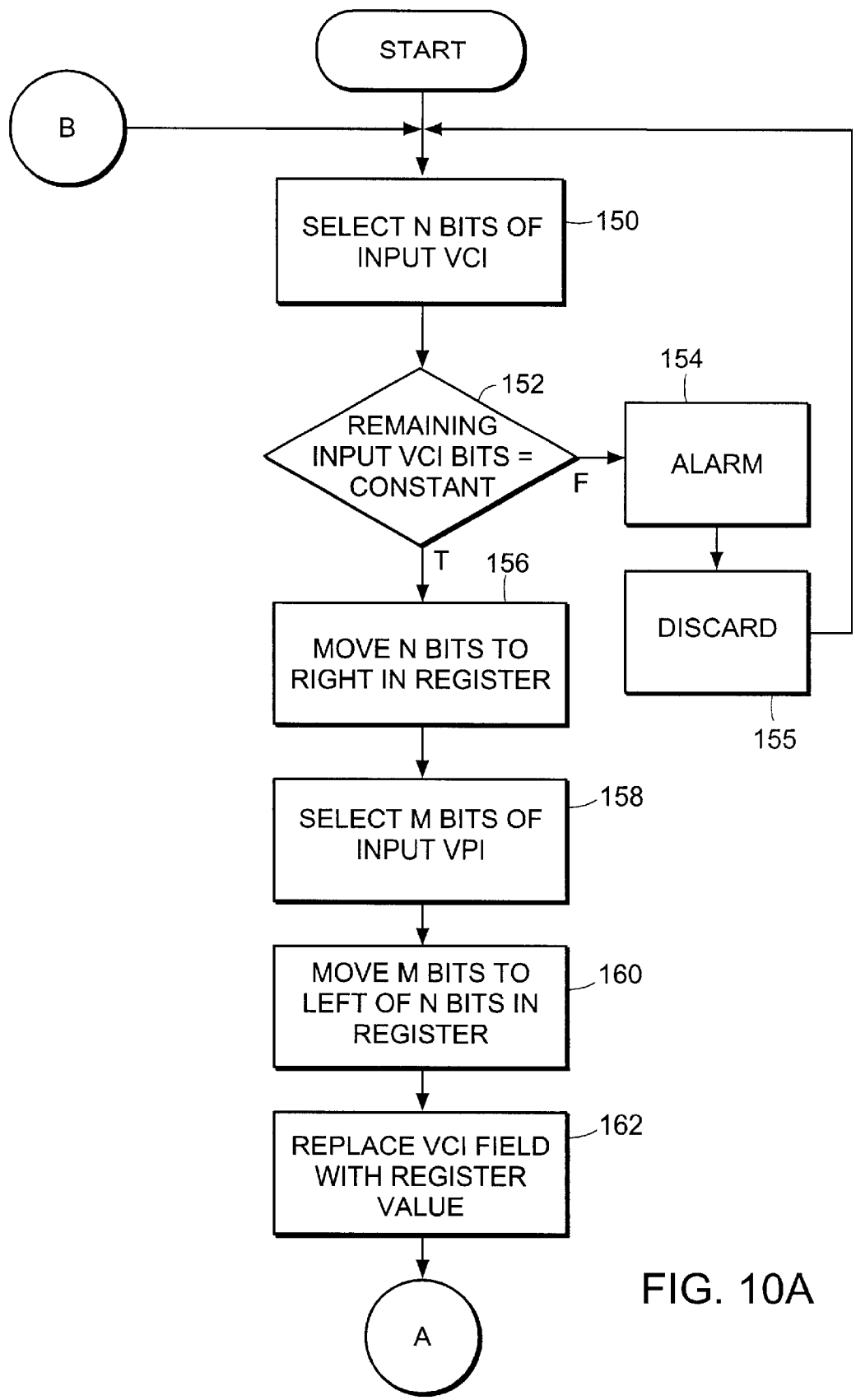
FIGS. 10A and 10B illustrate a flow diagram of a mapping process for use in the ingress node of the arrangement of FIG. 9.
Figure 11:
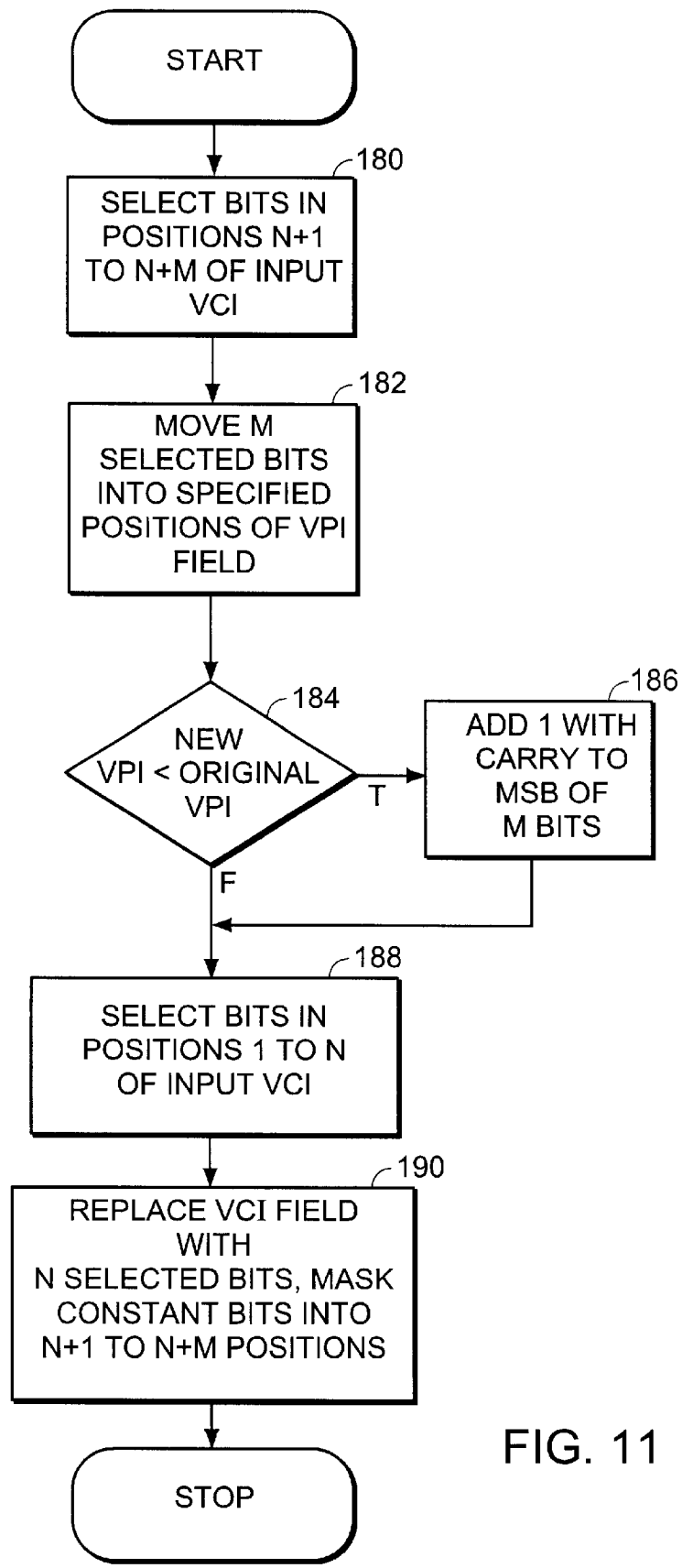
FIG. 11 is a flow diagram showing a mapping process for use in the egress nodes of the arrangement of FIG. 9.

The mapping process which the cell processor 102-2 performs on egress at nodes 42-2, 42-3 is shown in the process flow diagram of FIG. 11. Note that prior to reaching the cell processor at the egress node, the incoming VPI of the cell is first translated to the smallest configured source VPI that could be carried on the particular incoming virtual path. The cell mapping process starts at block 180 with the selection of M bits from bit positions N+1 to N+M (starting from the least significant bit position) of the input VCI. Alternatively, the M most significant bits can be selected. At block 182, the M selected bits are moved into specified positions of the VPI field, i.e., those bit positions of the M bits selected from the original input VPI. At block 184, if the resulting VPI is less than the original VPI, a value of 1 is added with carry to the left of the most significant bit of the M bits. At block 188, N bits of the input VCI are selected from bit positions 1 to N. The VCI field is replaced with the N selected bits at block 190. In addition, the bits which correspond to the unselected VCI bits at the ingress (see block 152, FIG. 10A) need to be restored to the VCI field. These VCI bits correspond to the constant provided by the system configuration management software and are masked into the N+1 to N+M bit positions. In this manner, the internal VPI/VCI is remapped to the original VPI/VCI.

Figure 10B:
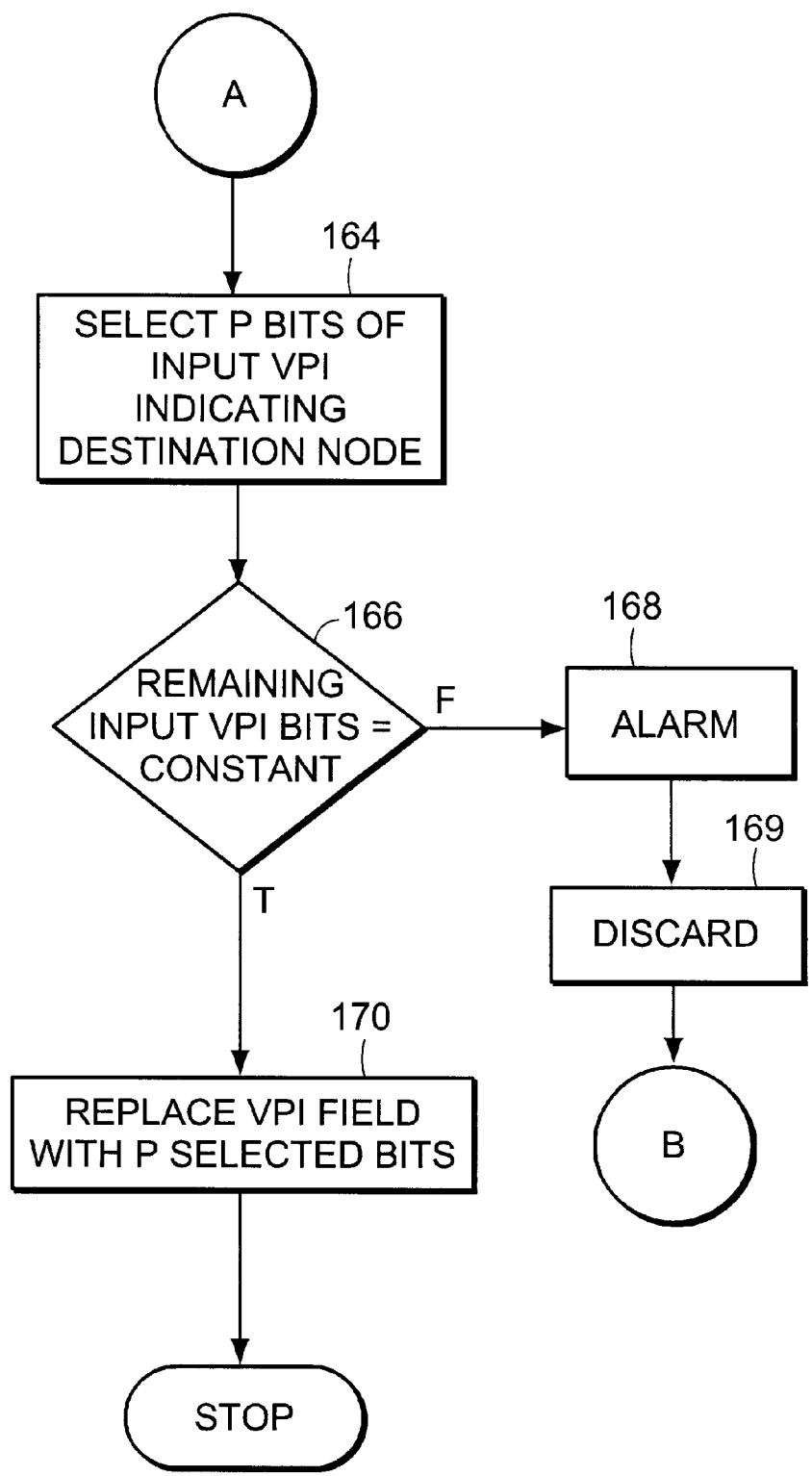

Referring again to FIG. 9, the mapping processes shown in FIGS. 10A, 10B and 11 can be illustrated by an example. In this example, it is assumed that the range of possible source VPIs from ingress node 42-1 to egress node 42-2 is from VPI=98=(0×62) to VPI=105=(0×69) and the corresponding range for VPIs from node 42-1 to node 42-3 is from VPI=208=(0×D0) to VPI=211=(0×D3).

Three ATM cells 49-a, 61-a, 63-a are received on link 50 at an input port on node 42-1. The cell 49-a has source VPI=105=(0×69) and VCI=(0×99); cell 61-a has source VPI=100=(0×64) and VCI=(0×25); cell 63-a has source VPI=210=(0×D2) and VCI=(0×19). As noted above, cells 49-a and 61-a are destined for egress node 42-2 while cell 63-a is destined for egress node 42-3. First the processing of cell 49-a is described.

The cell 49-a is processed by cell processor 102-1 according to the process shown in FIGS. 10A, 10B to replace the source VPI/VCI with an internal VPI=52=(0×34) and internal VCI=(0×2099). In this example, assume the number of VPIs per egress node is always even. Thus, k=1 and the value of P is obtained by keeping the significant bits from the source VPI, except for the least significant. That is, dropping the least significant bit is similar to dividing by two and rounding down. Thus, the VPI value 105=(0×69) becomes 52=(0×34). In this example, the source VPI bits that are placed in the internal VCI are the M least significant and M=3. These M bits effectively represent the value VPI modulo $2^3$. Thus, 105 modulo 8=1. In this manner, the internal VPI/VCI values of VPI=52=(0×34) and VCI=(0×2099) are generated.

The cell 49-b with this internal VPI/VCI information is then passed to the switch fabric 104-1 where the internal VPI/VCI information is translated via a local translation table to an outgoing VPI=(0×121) and outgoing VCI=(0×2099) on internal link 62. The intermediate node 42-i receives the cell 49-c on a virtual path indicated by VPI=(0×121) and routes the cell to an outgoing virtual path indicated by VPI=(0×387). Note that since the internal switching is virtual path switching, the VCI remains the same, i.e., VCI=(0×2099). At the egress node 42-2, the cell 49-d with VPI=(0×387) and VCI=(0×2099) is translated via a local translation table associated with switch fabric 104-2 to an internal cell 49-e having VPI=98=(0×62) and internal VCI=(0×2099). Recall that the translation table is configured to translate the incoming VPI to the smallest VPI value for that source endpoint, namely VPI=98=(0×62) for this case. The cell 49-e with this internal VPI/VCI information is passed to cell processor 102-2 which remaps the internal VPI/VCI information to the original source VPI=105=(0×69) and VCI=(0×99) according to the process shown in FIG. 11. In particular, note that the M=3 most significant bits of the VCI=(0×2099) is the value 1. Replacing the M=3 least significant bits of the VPI with the value 1 (incoming VPI=98=110010 (binary)), a new VPI=1100001 (binary)=97 is obtained. Since 97 is less than the original value of 98, a value of 1 is added in bit position M+1 of the VPI, obtaining VPI=1101001(binary)=105=(0×69) which is the original source VPI.

Referring to the ATM cell 61-a having source VPI=100=(0×64) and VCI=(0×25) received on link 60 at ingress node 42-1, one can readily determine that the same processing as described above, i.e., mapping according to FIGS. 10A, 10B and remapping according to FIG. 11, yields the original source VPI=100=(0×64) and VCI=(0×25) at the egress node 42-2. Likewise, the processing of cell 63-a having source VPI=210=(0×D2) and VCI=(0×19) and destined for egress node 42-3 can be readily determined from the above description. Note again that since virtual path switching is used internally, the source cells having differing VPI values but destined for the same destination endpoint share the same internal virtual path as defined by the concatenation of internal VPIs (e.g., VPI=(0×121), VPI=(0×387)).

In alternate embodiments for both point-to-point and point-to-multipoint connections, the mapping/remapping performed by the cell processors can be combined with the local translation table of the switch fabric so that a one-step mapping/remapping function is provided rather than the two-step approach described above.

Figure 12:
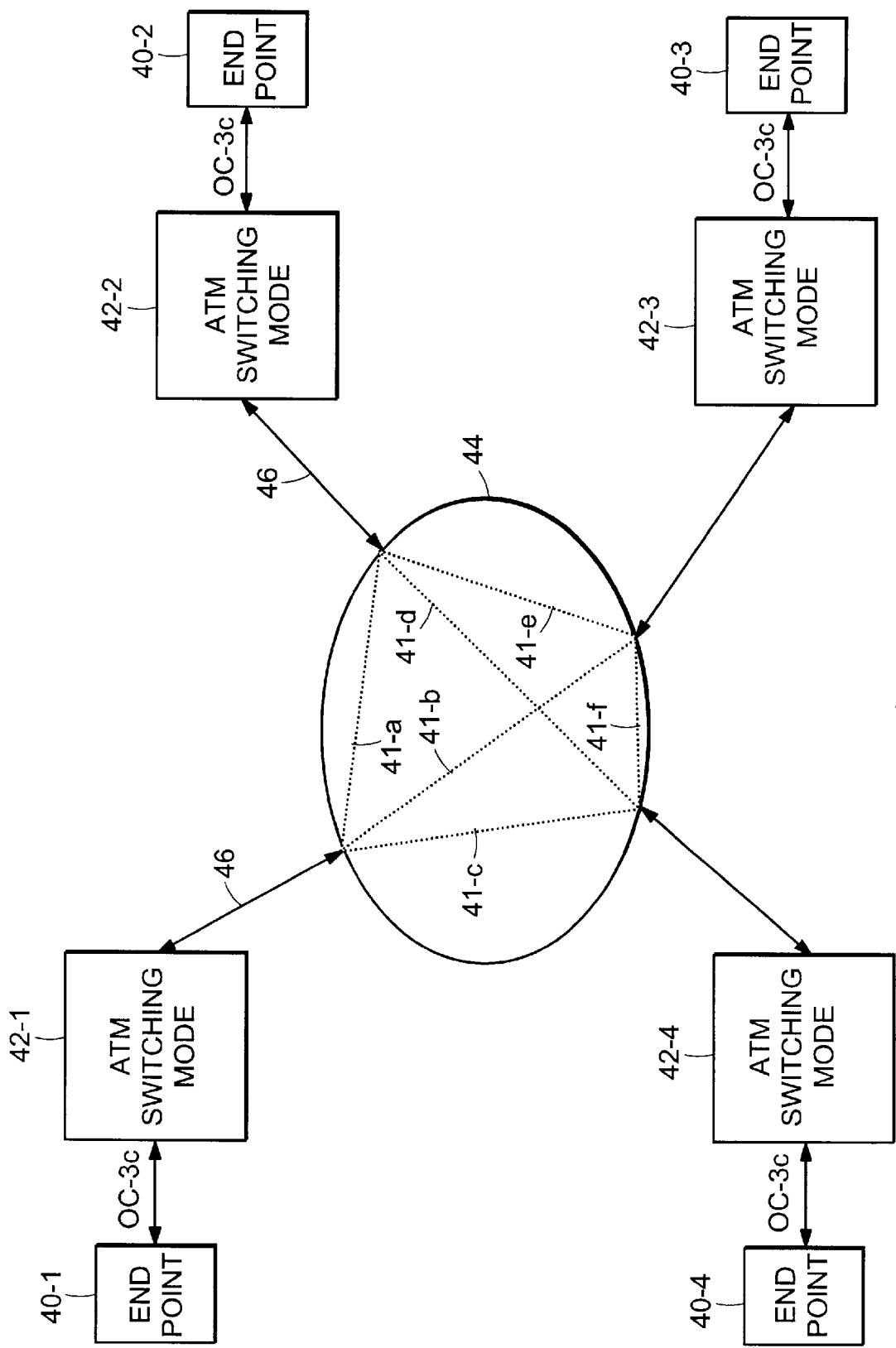
FIG. 12 is a block diagram showing an ATM network arrangement for multipoint-to-multipoint connections.

The mapping/remapping approach described above for point-to-multipoint connections can also be applied in the context of multipoint-to-multipoint connections. FIG. 12 shows an ATM network arrangement for a multipoint-to-multipoint or mesh network. In this arrangement, a portion of ATM cells from endpoint 40-1 is destined for endpoint 40-2 through path 41-a, another portion of cells from endpoint 40-1 is destined for endpoint 40-3 on path 41-b, and yet another portion is destined for endpoint 40-4 on path 41-c. Likewise, a portion of ATM cells from endpoint 40-2 is destined for endpoint 40-1 on path 41-a, another portion of cells from endpoint 40-2 is destined for endpoint 40-3 on path 41-e, and yet another portion is destined for endpoint 40-4 on path 41-d. Similar multipoint connections of ATM cells are shown for endpoints 40-3 and 40-4. For each node 42-1, 42-2, 42-3, 42-4, the mapping and remapping is performed on ATM cells on ingress and egress as described above for point-to-multipoint connections.

Figure 13:
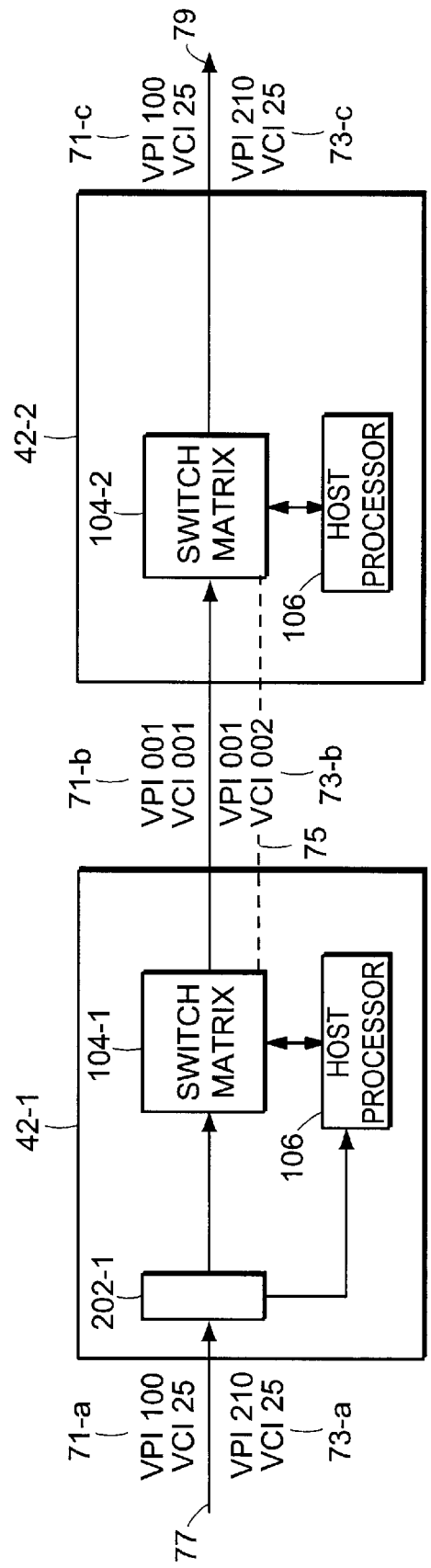
FIG. 13 is a block diagram of an alternate point-to-point connection mechanism in accordance with the present invention.

Referring now to FIG. 13, another alternate embodiment of the invention is shown. The point-to-point connection shows ingress node 42-1 connected to egress node 42-2. A source cell stream on link 77 connects to a receiving port of the ingress node 42-1 and exits a transmitting port of the egress node 42-2 on a destination cell stream 79. Each of the nodes are shown having a switch matrix 104-1, 104-2 and a host processor 106. The ingress node 42-1 further includes a cell processor 202-1 which provides a cell mapping function. In this embodiment, mapping of the source VPI/VCI information at the ingress node includes mapping a source VPI and a source VCI to an internal VPI and internal VCI, respectively. A mapping information message 75 is transmitted from the ingress node to the egress node indicating the mapping at the ingress node. The mapping information message is received at the egress node and the internal VPI and VCI are mapped to the source VPI and VCI, respectively, according to the mapping indicated by the mapping information message 75. This mapping is referred to as "cell learning" since the configuration of cell mapping is learned by the ingress and egress nodes.

For example, a source cell 71-a having source VPI=(0×100) and VCI=(0×25) is received at ingress node 42-1. Cell processor 202-1 determines whether the source VPI/VCI information is configured in its switch fabric 104-1. If it is not configured, the cell processor send a message to the host processor 106 indicating that the source VPI/VCI information is unknown. The host processor 106 deciphers the VPI/VCI information and configures the translation table of the switch fabric 104-1 to switch the source VPI/VCI to an internal VPI=(0×01) and assign an internal VCI=(0×01) for internal cell 71-b. In parallel, the host processor sends a message to the egress node 42-2 indicating the mapping information so that the egress node can remap internal cell 71-b to the original source VPI/VCI information to provide cell 71-c. Likewise, source cell 73-a having source VPI=(0×210) and VCI=(0×25) is processed to provide internal cell 73-b having VPI=(0×01) and VCI=(0×02). A mapping information message is also sent to the egress node 42-2 for remapping internal cell 73-b to original source VPI/VCI information to provide cell 73-c.

An advantage of the cell learning approach compared to the deterministic approach described above is that there are no constraints on the ranges of VPIs and VCIs that can be used by endpoint users. That is, a space with $2^{24}$ or $2^{28}$ addresses is available, though at most $2^{16}$ addresses, corresponding to the number of internal VCI, can be used simultaneously.

Figure 14:
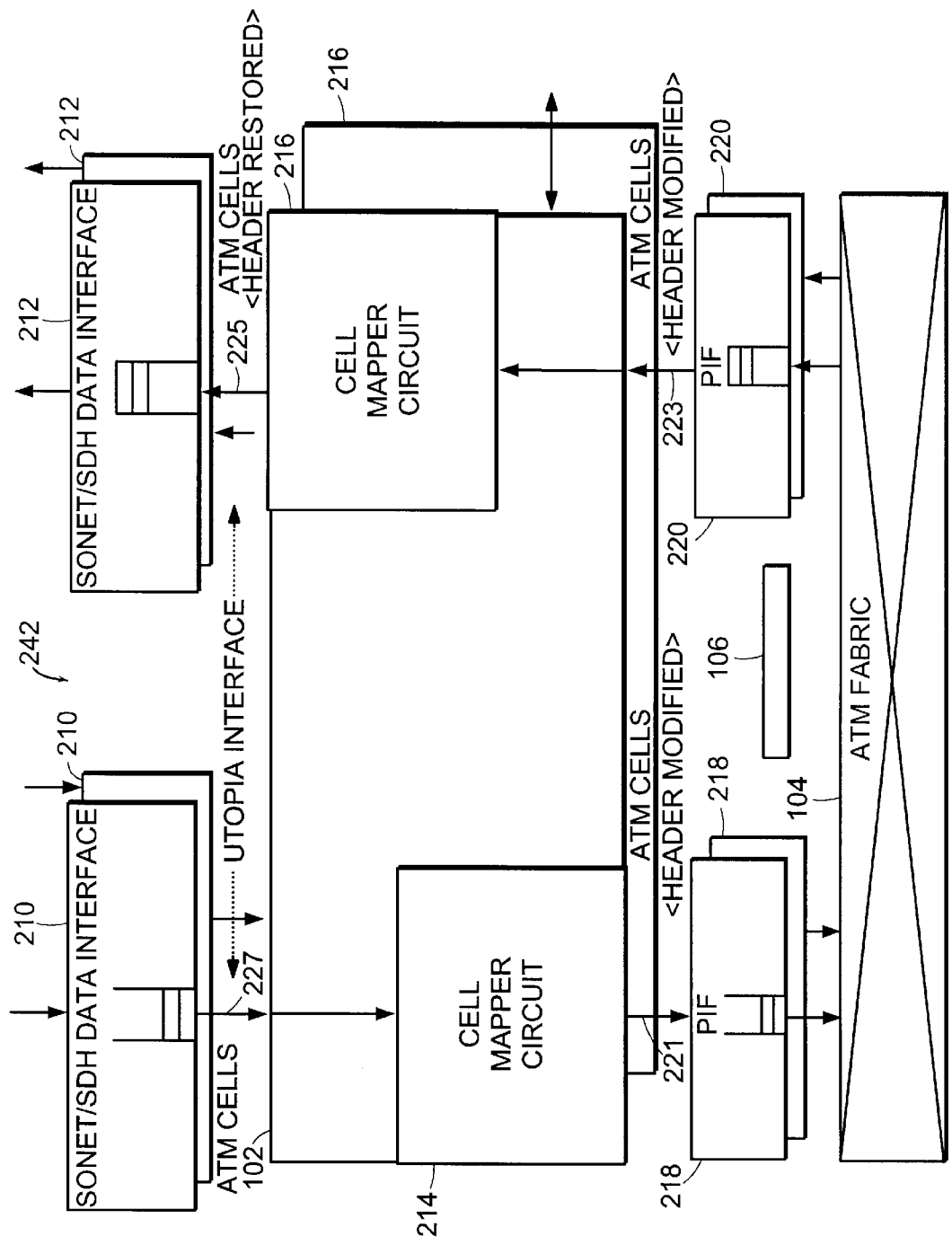
FIG. 14 is a schematic block diagram of a preferred embodiment of a node according to the present invention.

Having described the mapping processes, an ATM node which embodies the mapping mechanism is now described with reference to FIGS. 14 and 15. While the prior description and drawings simplified matters by showing the nodes as either ingress or egress nodes, the node 242 in FIG. 14 is shown as a bidirectional node, i.e., a node capable of serving both ingress and egress functions. The node 242 includes plural respective receive and transmit ports 210, 212, plural cell processors 102, a plurality of packet interface (PIF) circuits 218, 220, a switch fabric 104 and a host processor 106. The receive and transmit ports 210, 212 each terminate a network transmission line such as a SONET/SDH OC-3c rate signal.

On ingress, ATM cells are buffered in the receive port 210 through a Utopia interface to the cell processor 102. An HEC check is performed prior to the cell processor 102 using the HEC field of the ATM header. The cell processor 102 contains cell mapper circuitry 214, 216 described further herein which performs the point-to-point or point-to-multipoint mapping described above as appropriate for the type of desired connection. The output cells of the cell mapper circuit 214 with modified VPI/VCI information are buffered in the incoming PIF circuit 218 for switching through the switch fabric 104.

On egress, ATM cells switched through the fabric 104 are buffered in the outgoing PIF circuit 220 for processing by the cell mapper circuit 216. The output cells of the cell mapper circuit 216 with restored VPI/VCI information are buffered in the transmit port 212 for transmission to another network node. An HEC check sum for the output cells is generated prior to the transmission.

Figure 15:
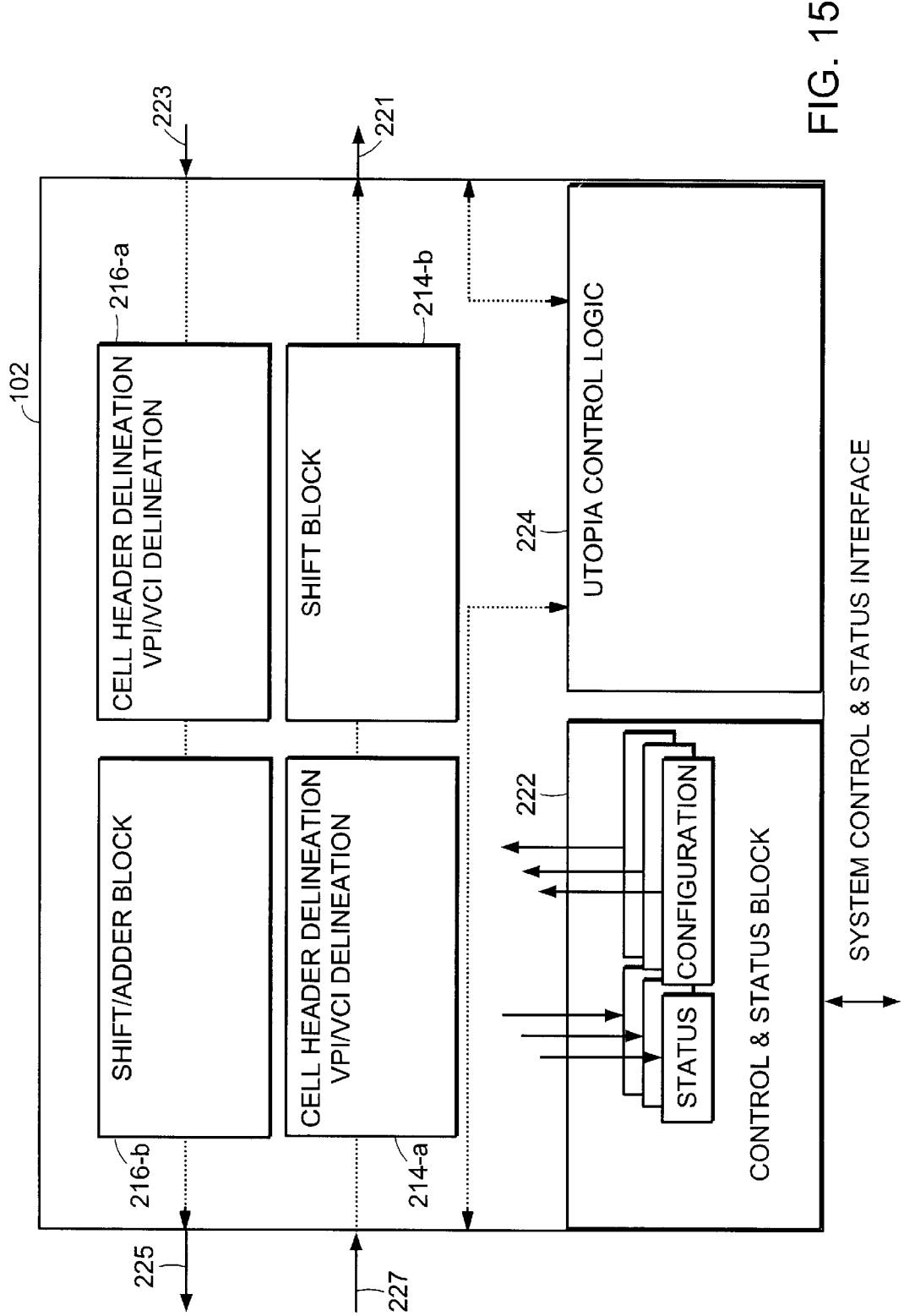
FIG. 15 is a schematic block diagram of the cell processor of the node in FIG. 14.

Referring now to FIG. 15, a preferred embodiment of the cell processor 102 is shown. The cell processor 102 includes cell mapper circuits 214, 216, a control/status block 222 conventional and Utopia control logic 224. The cell mapper circuits 214-a and 214-b perform respective cell header delineation (VPI/VCI delineation) and shift operations on ingress in accordance with the mapping processes described herein above. The cell mapper circuits 216-a and 216-b perform respective cell header delineation (VPI/VCI delineation) and shift/adder operations on egress in accordance with the mapping processes described herein above. The control/status block 222 includes configuration information under control of the host processor 106 (FIG. 14) for configuring the mapping circuits 214, 216 with the appropriate values of M, N and P.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for providing a connection between a source endpoint and destination endpoint through an asynchronous transfer mode (ATM) network, the method comprising the steps of:

providing a network of plural ATM switching nodes, including an ingress node and an egress node, the ingress node having a receiving port for receiving ATM cells from a source endpoint, the egress node having a transmitting port for transmitting ATM cells to a destination endpoint;

receiving source ATM cells at the ingress node, each ATM cell having a header which includes source virtual path identifier/virtual circuit identifier (VPI/VCI) information;

mapping the source VPI/VCI information of each received source ATM cell to internal VPI/VCI information to provide internal ATM cells;

switching the internal ATM cells through the network to the egress node; and mapping the internal VPI/VCI information of each internal ATM cell to the source VPI/VCI information at the egress node for transmission to the destination endpoint;

wherein the source VPI/VCI information comprises a source VPI and a source VCI and wherein the step of mapping the source VPI/VCI information includes mapping the source VPI and the source VCI to an internal VCI comprising:

selecting N bits of the source VCI;

storing the N selected bits in a register;
selecting M bits of the source VPI;
storing the M selected bits in the register to the left of the N bits to provide M+N bits; and
replacing the VCI field of the source ATM cell with the M+N bits from the register.

2. The method of claim 1 wherein the step of switching comprises switching the internal ATM cells through the network on a virtual path corresponding to the internal VPI/VCI information.

3. The method of claim 1 wherein the source VPI/VCI information comprises a source VPI and a source VCI and the step of mapping the source VPI/VCI information comprises mapping the source VPI and the source VCI to an internal VPI and internal VCI, respectively; and further comprising the step of transmitting a mapping information message from the ingress node to the egress node indicating the mapping at the ingress node.

4. The method of claim 3 further comprising receiving the mapping information message at the egress node and wherein the step of mapping the internal VPI/VCI information comprises mapping the internal VPI and the internal VCI to the source VPI and the source VCI, respectively, according to the mapping indicated by the mapping information message.

5. The method of claim 4 wherein the step of switching comprises switching the internal ATM cells through the network on a virtual path based on the internal VPI.

6. A method for providing a connection between a source endpoint and plural destination endpoints through an asynchronous transfer mode (ATM) network, the method comprising the steps of:

providing a network of plural ATM switching nodes, including an ingress node and plural egress nodes, the ingress node having a receiving port for receiving ATM cells from a source endpoint, the egress nodes each having a transmitting port for transmitting ATM cells to a corresponding destination endpoint;

receiving source ATM cells at the ingress node, each ATM cell having a header which includes source virtual path identifier/virtual circuit identifier (VPI/VCI) information;

mapping the source VPI/VCI information of each received source ATM cell to internal VPI/VCI information having information indicating a particular egress node to provide internal ATM cells;

switching the internal ATM cells through the network to the particular egress node indicated by the internal VPI/VCI information; and mapping the internal VPI/VCI information of each internal ATM cell to the source VPI/VCI information at the particular egress node for transmission to the corresponding destination endpoint;

wherein the step of mapping the source VPI/VCI information includes mapping a source VPI and a source VCI to an internal VCI and mapping a portion of the source VPI to an internal VPI indicating a particular egress node;

wherein the step of mapping the source VPI and the source VCI to an internal VCI comprises:

selecting N bits of the source VCI;
storing the N selected bits in a register;
selecting M bits of the source VPI;
storing the M selected bits in the register to the left of the N bits to provide M+N bits; and
replacing the VCI field of the source ATM cell with the M+N bits from the register.

7. The method of claim 6 wherein the step of mapping a portion of the source VPI comprises:
   selecting P bits of the source VPI; and
   replacing the VPI field of the source ATM cell with the P selected bits.

8. A communication system comprising:
   an ingress node comprising:
      a receiving port for receiving source ATM cells from a source endpoint, the source ATM cells each having a header which includes source virtual path identifier/virtual circuit identifier (VPI/VCI) information; and
      a cell processor for mapping the source VPI/VCI information of each received source ATM cell to internal VPI/VCI information to provide internal ATM cells;
   a switching network for connecting the internal ATM cells to the egress node; and an egress node comprising:
      a cell processor for mapping the internal VPI/VCI information of each internal ATM cell to the source VPI/VCI information to provide output ATM cells; and
      a transmitting port for transmitting the output ATM cells to a destination endpoint;
   wherein the source VPI/VCI information comprises a source VPI and a source VCI and wherein the cell processor of the ingress node is operable to map the source VPI and the source VCI to an internal VCI, the cell processor of the ingress node comprising:
      means for selecting N bits of the source VCI;
      means for selecting M bits of the source VPI;
      a register for storing the N selected bits and for storing the M selected bits to the left of the N bits to provide M+N bits; and
      means for replacing the VCI field of the source ATM cell with the M+N bits from the register.

9. The system of claim 8 wherein the switching network includes a virtual path corresponding to the internal VPI/VCI information for switching the internal ATM cells through the network.

10. The system of claim 8 wherein the source VPI/VCI information comprises a source VPI and a source VCI and the cell processor of the ingress node is operable to map the source VPI and the source VCI to an internal VPI and internal VCI, respectively; and wherein the ingress node further comprises a host processor for transmitting a mapping information message to the egress node indicating the mapping at the ingress node.

11. The system of claim 10 wherein the egress node further comprises a host processor for receiving the mapping information message and wherein the cell processor of the egress node is operable to map the internal VPI and the internal VCI to the source VPI and the source VCI, respectively, according to the mapping indicated by the mapping information message.

12. The system of claim 11 wherein the switching network includes a virtual path corresponding to the internal VPI for switching the internal ATM cells through the network.

13. The system of claim 8 further comprising plural egress nodes and wherein the cell processor of the ingress node is further operable to map the source VPI/VCI information of each received source ATM cell to internal VPI/VCI information having information indicating a particular egress node; the switching network is further operable to switch the internal ATM cells through the network to the particular egress node indicated by the internal VPI/VCI information; and the cell processor of each egress node is operable to map the internal VPI/VCI information of each internal ATM cell to the source VPI/VCI information at the particular egress node for transmission to a corresponding destination endpoint.

14. A switching node comprising:
   a receiving port for receiving source ATM cells from a source endpoint, the source ATM cells each having a header which includes source virtual path identifier/virtual circuit identifier (VPI/VCI) information;
   a cell processor for mapping the source VPI/VCI information of each received source ATM cell to internal VPI/VCI information to provide internal ATM cells;
   a transmitting port for transmitting the internal ATM cells to an ATM network; and
   a switching fabric for connecting the internal ATM cells to the transmitting port;
   wherein the source VPI/VCI information comprises a source VPI and a source VCI and wherein the cell processor is operable to map the source VPI and the source VCI to an internal VCI;
   wherein the cell processor comprises:
      means for selecting N bits of the source VCI;
      means for selecting M bits of the source VPI;
      a register for storing the N selected bits and for storing the M selected bits to the left of the N bits to provide M+N bits; and
      means for replacing the VCI field of the source ATM cell with the M+N bits from the register.

15. A method for providing a connection between a source endpoint and destination endpoint through an asynchronous transfer mode (ATM) network, the method comprising the steps of:
   providing a network of plural ATM switching nodes, including an ingress node and an egress node, the ingress node having a receiving port for receiving ATM cells from a source endpoint, the egress node having a transmitting port for transmitting ATM cells to a destination endpoint;
   receiving source ATM cells at the ingress node, each ATM cell having a header which includes source virtual path identifier/virtual circuit identifier (VPI/VCI) information;
   mapping the source VPI/VCI information of each received source ATM cell to internal VPI/VCI information to provide internal ATM cells;
   switching the internal ATM cells through the network to the egress node; and
   mapping the internal VPI/VCI information of each internal ATM cell to the source VPI/VCI information at the egress node for transmission to the destination endpoint;
   wherein the source VPI/VCI information comprises a source VPI and a source VCI and the internal VPI/VCI information comprises an internal VPI and an internal VCI, wherein the internal VCI comprises M+N bits and wherein the step of mapping the internal VPI/VCI information to the source VPI/VCI information includes mapping the internal VCI to the source VPI and the source VCI comprises:
      selecting M bits from the internal VCI;
      replacing the VPI field of the internal ATM cell with the M selected bits;
      selecting N bits from bit positions 1 to N of the internal VCI; and
      replacing the VCI field of the internal ATM cell with the N selected bits.

16. The method of claim 15 wherein the step of selecting M bits includes selecting M bits from bit positions N+1 to N+M of the internal VCI.

17. The method of claim 15 wherein the step of selecting M bits includes selecting M most significant bits from the internal VCI.

18. A method for providing a connection between a source endpoint and destination endpoint through an asynchronous transfer mode (ATM) network, the method comprising the steps of:

providing a network of plural ATM switching nodes, including an ingress node and an egress node, the ingress node having a receiving port for receiving ATM cells from a source endpoint, the egress node having a transmitting port for transmitting ATM cells to a destination endpoint;

receiving source ATM cells at the ingress node, each ATM cell having a header which includes source virtual path identifier/virtual circuit identifier (VPI/VCI) information;

mapping the source VPI/VCI information of each received source ATM cell to internal VPI/VCI information to provide internal ATM cells;

switching the internal ATM cells through the network to the egress node; and mapping the internal VPI/VCI information of each internal ATM cell to the source VPI/VCI information at the egress node for transmission to the destination endpoint;

wherein the step of providing includes providing a plurality of egress nodes and wherein the step of mapping the source VPI/VCI information includes mapping a source VPI and a source VCI to an internal VCI and mapping a portion of the source VPI to an internal VPI indicating a particular egress node, and wherein the step of mapping the internal VPI/VCI information includes mapping the internal VCI to the source VPI and the source VCI and wherein the step of mapping the source VPI and the source VCI to an internal VCI comprises:

selecting N bits of the source VCI;
storing the N selected bits in a register;
selecting M bits of the source VPI;
storing the M selected bits in the register to the left of the N bits to provide M+N bits; and
replacing the VCI field of the source ATM cell with the M+N bits from the register.

19. The method of claim 18 wherein the step of mapping a portion of the source VPI comprises:

selecting P bits of the source VPI; and
replacing the VPI field of the source ATM cell with the P selected bits.

20. The method of claim 19 wherein the step of mapping the internal VCI to the source VPI and source VCI at the egress node comprises:

selecting M bits from the internal VCI;
replacing the VPI field of the internal ATM cell with the M selected bits;
selecting N bits from bit positions 1 to N of the internal VCI; and
replacing the VCI field of the internal ATM cell with the N selected bits.

21. The method of claim 20 wherein the step of the selecting M bits includes selecting M bits from bit positions N+1 to N+M of the internal VCI.

22. The method of claim 20 wherein the step of selecting M bits includes selecting M most significant bits from the internal VCI.

23. The method of claim 20 wherein the step of mapping further comprises adding a value of 1 with carry to the most significant bit of the M selected bits in the replaced VPI field if the replaced VPI field has a value less than the source VPI.

24. A method for providing a connection between a source endpoint and plural destination endpoints through an asynchronous transfer mode (ATM) network, the method comprising the steps of:

providing a network of plural ATM switching nodes, including an ingress node and plural egress nodes, the ingress node having a receiving port for receiving ATM cells from a source endpoint, the egress nodes each having a transmitting port for transmitting ATM cells to a corresponding destination endpoint;

receiving source ATM cells at the ingress node, each ATM cell having a header which includes source virtual path identifier/virtual circuit identifier (VPI/VCI) information;

mapping the source VPI/VCI information of each received source ATM cell to internal VPI/VCI information having information indicating a particular egress node to provide internal ATM cells;

switching the internal ATM cells through the network to the particular egress node indicated by the internal VPI/VCI information; and mapping the internal VPI/VCI information of each internal ATM cell to the source VPI/VCI information at the particular egress node for transmission to the corresponding destination endpoint;

wherein the step of mapping the internal VPI/VCI information includes mapping an internal VCI to a source VPI and a source VCI at the egress node comprising:

selecting M bits from the internal VCI;
replacing the VPI field of the internal ATM cell with the M selected bits;
selecting N bits from bit positions 1 to N of the internal VCI; and
replacing the VCI field of the internal ATM cell with the N selected bits.

25. The method of claim 24 wherein the step of the selecting M bits includes selecting M bits from bit positions N+1 to N+M of the internal VCI.

26. The method of claim 24 wherein the step of selecting M bits includes selecting M most significant bits from the internal VCI.

27. The method of claim 24 wherein the step of mapping further comprises adding a value of 1 with carry to the most significant bit of the M selected bits in the replaced VPI field if the replaced VPI field has a value less than the source VPI.

28. A communication system comprising:

an ingress node comprising:
a receiving port for receiving source ATM cells from a source endpoint, the source ATM cells each having a header which includes source virtual path identifier/virtual circuit identifier (VPI/VCI) information; and
a cell processor for mapping the source VPI/VCI information of each received source ATM cell to internal VPI/VCI information to provide internal ATM cells;
a switching network for connecting the internal ATM cells to the egress node; and an egress node comprising:
a cell processor for mapping the internal VPI/VCI information of each internal ATM cell to the source VPI/VCI information to provide output ATM cells; and a transmitting port for transmitting the output ATM cells to a destination endpoint;

wherein the source VPI/VCI information comprises a source VPI and a source VCI and the internal VPI/VCI information comprises an internal VPI and an internal VCI, and wherein the cell processor of the egress node is operable to map the internal VCI to the source VPI and the source VCI;

wherein the internal VCI comprises M+N bits and the cell processor of the egress node comprises:

means for selecting M bits from the internal VCI;

means for selecting N bits from bit positions 1 to N of the internal VCI;

means for replacing the VPI field of the internal ATM cell with the M selected bits; and means for replacing the VCI field of the internal ATM cell with the N selected bits.

* * * * *